(12) United States Patent
Carey et al.

(10) Patent No.: US 7,702,912 B2
(45) Date of Patent: Apr. 20, 2010

(54) SECURE SYSTEMS MANAGEMENT

(75) Inventors: Jon Michael Carey, Spanish Fork, UT (US); James Bart Whiteley, Provo, UT (US); Alexander Y. Danoyan, Riverton, UT (US); Scott A. Isaacson, Woodland Hills, UT (US); Eric W. B. Anderson, Alpine, UT (US)

(73) Assignee: Novell, Inc., Provo, UT (US)

( * ) Notice: Subject to any disclaimer, the term of this patent is extended or adjusted under 35 U.S.C. 154(b) by 1278 days.

(21) Appl. No.: 11/134,542

(22) Filed: May 19, 2005

(65) Prior Publication Data
US 2006/0265597 A1 Nov. 23, 2006

(51) Int. Cl.
*G06F 21/00* (2006.01)
*H04L 9/32* (2006.01)
(52) U.S. Cl. .................................................. 713/182
(58) Field of Classification Search .................. None
See application file for complete search history.

(56) References Cited

U.S. PATENT DOCUMENTS 5,961,593 A * 10/1999 Gabber et al. ............... 709/219

| | | | |
|---|---|---|---|
| 2003/0115292 A1 | 6/2003 | Griffin et al. | |
| 2003/0172127 A1* | 9/2003 | Northrup et al. | 709/219 |
| 2004/0049697 A1 | 3/2004 | Edwards, Jr. et al. | |
| 2004/0196981 A1* | 10/2004 | Nakano et al. | 380/280 |
| 2006/0168216 A1* | 7/2006 | Wolf-Reber | 709/225 |

OTHER PUBLICATIONS

Tanenbaum, Andrew; Modern Operating Systems; 2nd ed.; 2001; Prentice Hall, Upper Saddle River, NJ; pp. 753-757.

* cited by examiner

*Primary Examiner*—Brandon S Hoffman
(74) *Attorney, Agent, or Firm*—Marger Johnson & McCollom, P.C.

(57) ABSTRACT

To effect a change to the system, a user process makes a request. An interface receives the request, and attempts to authenticate the user. Assuming the user is authenticated, the interface determines the user's UID. The interface determines a provider process that can make the requested change, and forwards the request to the provider process. The interface also assigns the user's UID to the provider process's eUID. The provider process then attempts to make the change, provided the change can be made given the eUID assignment. The provider process then attempts to run under the new eUID, enabling the system to prohibit it from doing something that is not authorized for that user. This protects the system from inadvertently executing management operations by one provider process that is not expected or intended by the user of another provider process.

23 Claims, 9 Drawing Sheets

SECURE SYSTEMS MANAGEMENT

FIELD OF THE INVENTION

This invention pertains to systems management, and more particularly to enhancing security in systems management.

BACKGROUND OF THE INVENTION

One feature present in modern operating systems is a Common Information Model Object Manager (CIMOM). The CIMOM provides for a standardized way for processes to request changes to be made, perhaps to the operating system, perhaps to applications. The CIMOM determines the provider process that should handle the request, and forwards the request to that provider process.

A problem with this design is that sometimes the provider process runs in the same thread as the CIMOM interface. This means that the provider process receives the same user ID (UID) as the CIMOM. Since the CIMOM runs as a root process, the provider process also runs as a root process. But this means that the provider process is capable of making system changes. Since the provider process does not have any information about the process that requested the change, the provider process is capable of making changes to the system on behalf of a user who would ordinarily not have the authority to make such a change.

The invention addresses these problems and others in the art.

SUMMARY OF THE INVENTION

The invention introduces a provider interface layer between the CIMOM and the provider processes. The provider interface layer is responsible for authenticating the user whose process requested the change from the CIMOM. After the user is authenticated, the provider interface layer determines the user's UID. The provider interface layer then assigns the user's UID as the effective UID of the provider process that handles the request. If the provider process needs to communicate with the CIMOM or otherwise needs a root UID, the provider interface layer can change the effective UID of the provider process to a root UID.

DETAILED DESCRIPTION OF THE EMBODIMENTS

Figure 1:
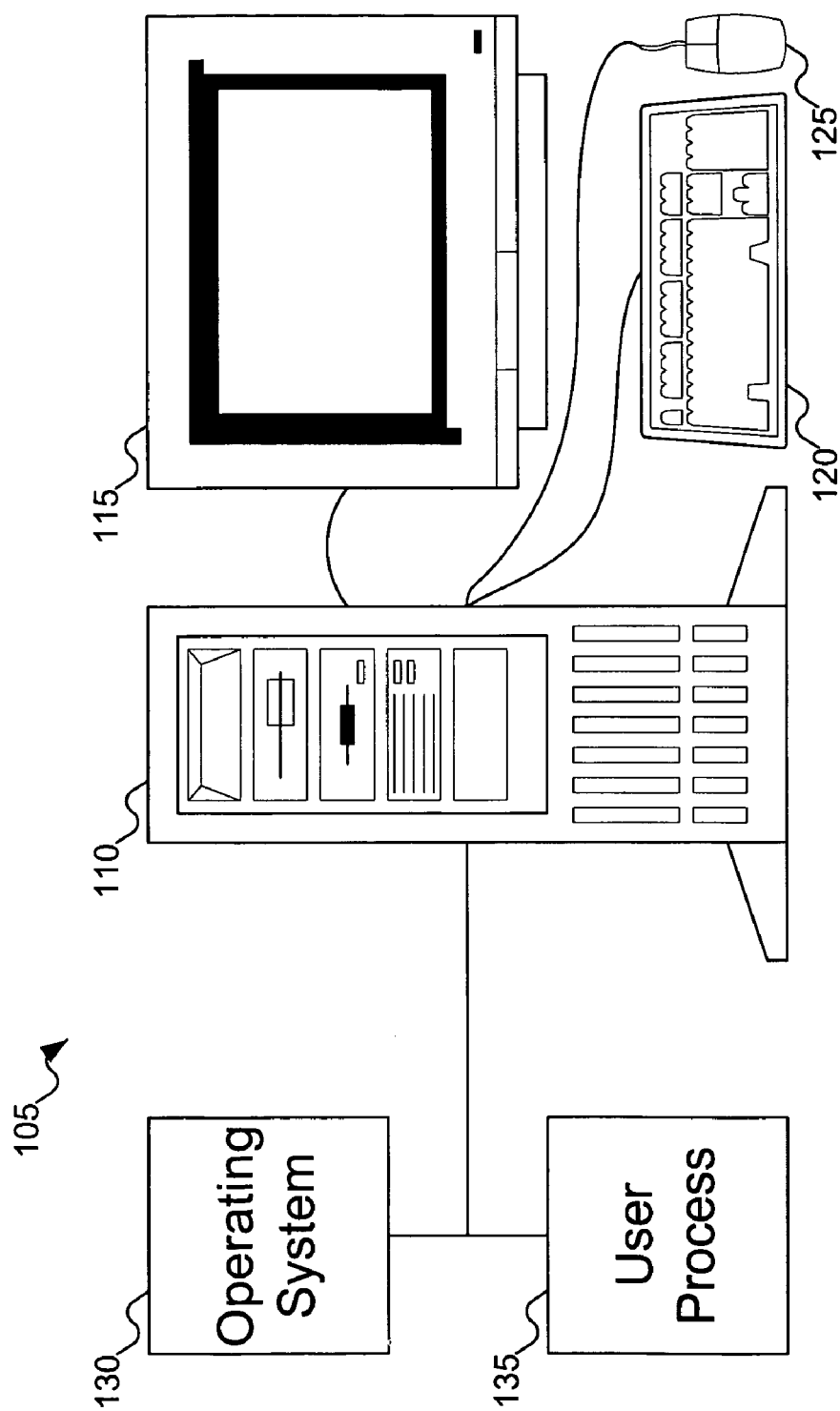
FIG. 1 shows a computer in which an embodiment of the invention is operable.

FIG. 1 shows a computer in which an embodiment of the invention is operable. In FIG. 1, computer system 105 is shown as including computer 110, monitor 115, keyboard 120, and mouse 125. Not shown in FIG. 1 are the internal components of computer system 105, such as the processor, memory, bus, and other components.

Installed on computer system 105 is operating system 130. Operating system 130 can be any operating system capable of applying an embodiment of the invention. A typical operating system would be an embodiment of the Linux® operating system, but any operating system that can support an embodiment of the invention could be used. (Linux is a registered trademark of Linus Torvalds.) In the discussion below, the focus will be on embodiments of the invention that can be implemented using the Linux operating system, but a person skilled in the art will recognize how the embodiments can be adapted for other operating systems, and how terminology might change.

Computer system 105 also has user process 135. In an operating system like Linux, there can be different processes running at the same time on computer system 105. Although processes can communicate with each other, in general each process can be thought of as separate from all other processes and, generally, each process can view computer system 105 as being dedicated solely to the process (even if it is not the only process on computer system 105).

Different processes can also have different permissions. Permissions limit what the process can do to the computer. User processes, such as user process 135, in general, run with reduced permissions: in other words, user process 135 is limited in what it can do. For example when it comes to modifying files, a root process can modify any file on computer system 105; user process 135 is typically limited to modifying files that are owned by the user who initiated user process 135. This distinction is intentional, as it prevents regular users from affecting each others' files and from accidentally (or intentionally) corrupting operating system 130.

Figure 2:
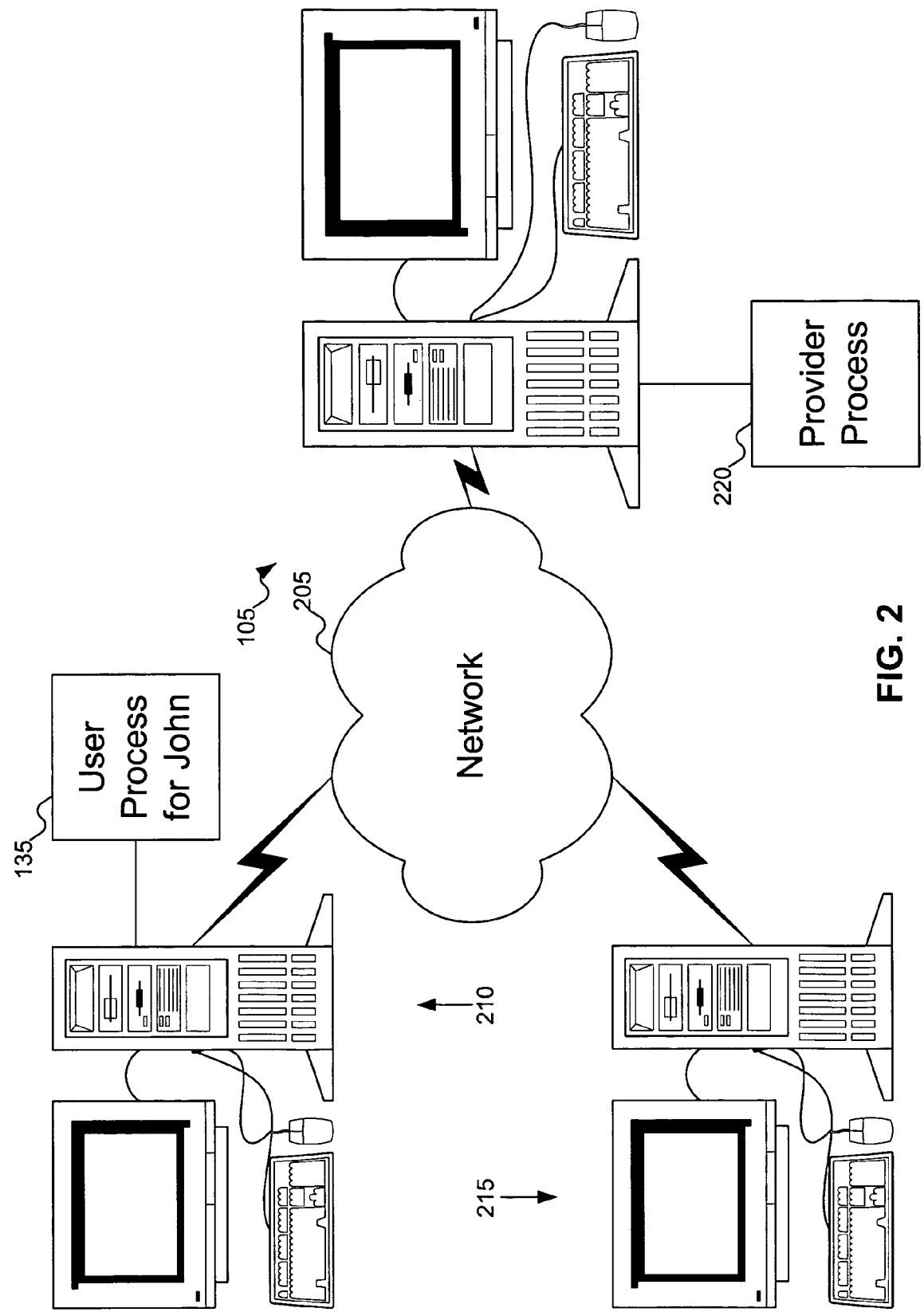
FIG. 2 shows the computer of FIG. 3 connected via a network to other computers, according to an embodiment of the invention.

FIG. 2 shows machine 105 connected to network 205, the network connecting several other computers. Two computers, 210 and 215, are shown, but a person skilled in the art will recognize that there can be any number of machines connected via the network. Computer 210 is shown including user process 135, a process for a user named John. This situation can arise in several ways. For example, computer 210 might be a workstation, which John is using. Or, computer 210 might be a server carrying out some process for the user John, who is using another computer to request the process. (In this latter situation, the computer used by John is often called a client, but a person skilled in the art will recognize that the terms "client" and "server" should not be interpreted in any way that might limit the varieties of machines in either role.) A person skilled in the art will recognize other ways in which computer 210 might carry out the process on John's behalf.

User process 135 can make a request of provider process 220 on machine 305, even though user process 135 is running on another computer. Assuming that machine 305 is configured to allow remote access to provider process 220, there is no requirement that user process 135 be running on machine 305.

Although FIG. 2 (and FIG. 3) shows machine 305 and computers 210 and 215 as ordinary computers and network 205 as a typical network, a person skilled in the art will recognize that the equipment can take any desired form. For example, computer 210 might be a personal digital assistant (PDA). Or computer 215 might be a device including an embedded processor. And network 205 can use any desired communication protocol and could be configured as a wired or wireless network, connecting machine 205 and computers 210 and 215 (and possibly other computers) using direct connections, a Local Area Network (LAN), Wide Area Network (WAN), Metropolitan Area Network (MAN), or using a public network, such as the Internet, among other possibilities. If using a wireless network, network 205 might be Bluetooth network or a network offering connectivity using the IEEE 802.11 a/b/g/n standards, among other possibilities.

Depending on the configuration of the equipment and the location of the resource in question, a system that embodies the invention can include a single computer (including both provider process 220 and user process 135), in which case network 205 can be omitted. Or a system embodying the invention can include multiple machines, connected in some manner, with resources and processes distributed among the machine. A person skilled in the art will recognize other possible configurations.

Figure 3:
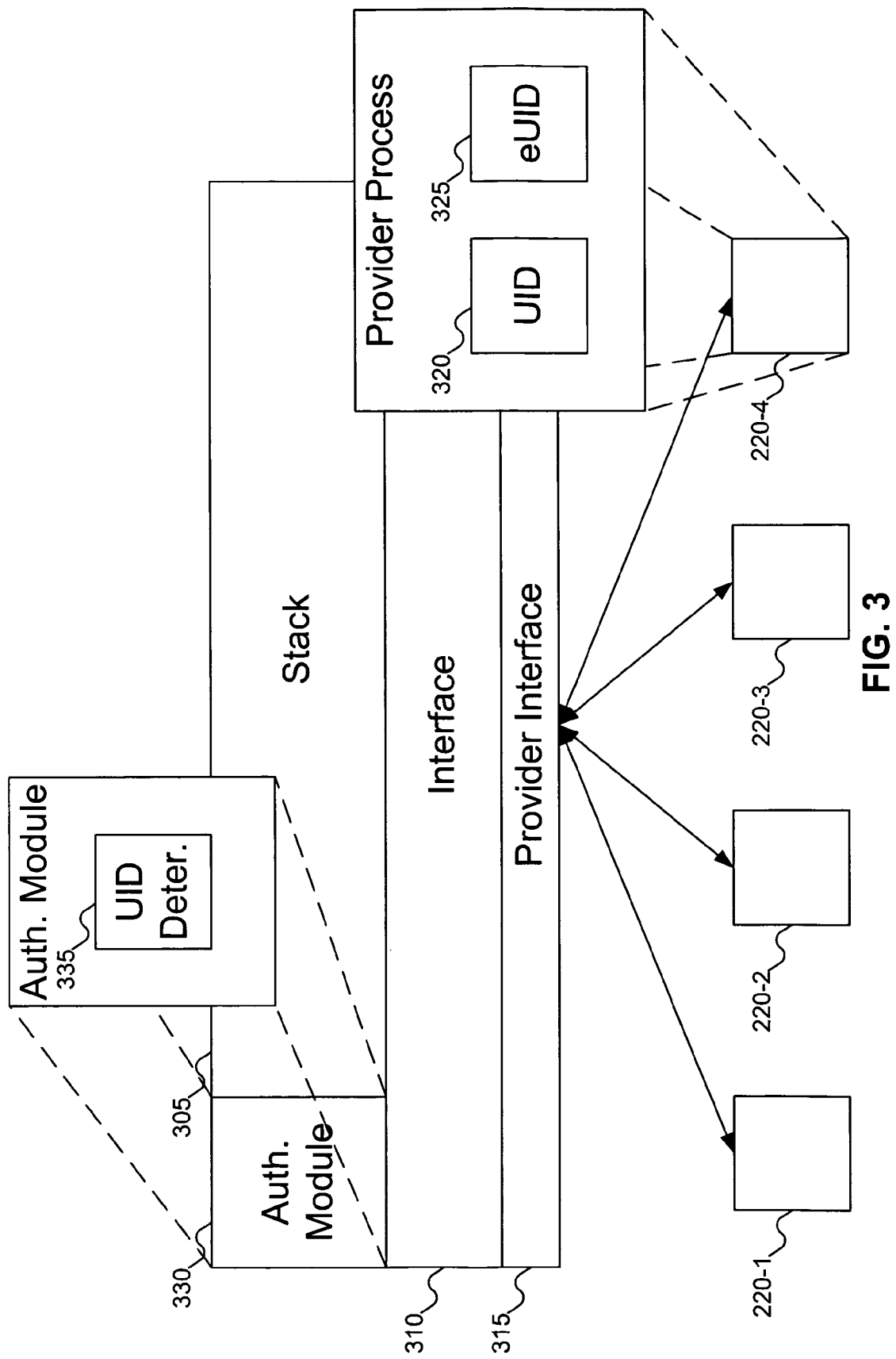
FIG. 3 shows the interface to provider processes for requests by the user process of FIG. 1, according to an embodiment of the invention.

FIG. 3 shows the interface to provider processes for requests by the user process of FIG. 1, according to an embodiment of the invention. In FIG. 3, several elements are shown. Stack 305 is used to receive requests for changes from the user processes. This information is provided to interface 310, which can be a CIMOM. Interface 310 is typically a root process, and is responsible for determining which of the various provider processes is to carry out the request. Examples of provider processes are provider processes 220-1, 220-2, 220-3, and 220-4, although a person skilled in the art will recognize that there can be any number of provider processes. The provider processes are typically started as root processes, just like interface 310.

Between interface 310 and provider processes 220-1 through 220-4 lies provider interface 315. Provider interface 315 acts as a go-between for provider processes 220-1 through 220-4, in that provider interface 315 is responsible for controlling the behavior of provider processes 220-1 through 220-4. Specifically, provider interface 315 is responsible for assigning the appropriate user ID (UID) to the provider process. As shown in the blow-up of provider process 220-4, the provider process includes two UIDs: UID 320, and effective UID (eUID) 325. eUID 325 enables the provider process to run with reduced privileges. Thus, even though UID 320 might be set to the root user, eUID 325 can be set to the UID of the user process that requested the change. By setting eUID 325 to the UID of the user process, the provider process can run as if it were initiated by the user. As an aside, it is worth noting that this process does not work in reverse: that is, setting eUID 325 to a higher level of permission than UID 320 does not permit the provider process to execute with an increased level of permission. But because the provider process is typically started as a root process, this reverse situation is not usually a concern.

To be able to set eUID 325 to the UID of the user process, provider interface 315 needs to know the UID of the user process. Authentication module 330 provides this information. When the user process requests the change, authentication module challenges the user to authenticate himself. Typically, the user provides a username and password to perform the authentication, but any authentication scheme can be used. Once the user is authenticated and identified, UID determiner 335 can determine the user's UID. Provider interface 315 can then use this information to set eUID 325 to the user's UID, to appropriately limit the provider process in what changes it can make.

It can happen that, as part of carrying out a requested change, the provider process needs to communicate with interface 310. As interface 310 runs as a root process, this communication can be hindered or prevented by the fact that the provider process has an eUID providing less permission than a root process. To enable this communication, provider interface 315 can change the provider process's eUID back to the root user during the period of communication, and reset the provider process's eUID to the user's UID when communication is finished. A person skilled in the art will recognize that these changes are not limited to periods of communication between the provider process and interface 310: provider interface 315 can make this change at any time the provider process needs to run as a root process. (Of course, to change the provider process's eUID when it is trying to make the requested change would not be sensible, since it is the fact that the eUID denies the provider process root privileges that is of value in embodiments of the invention.)

Figure 4A:
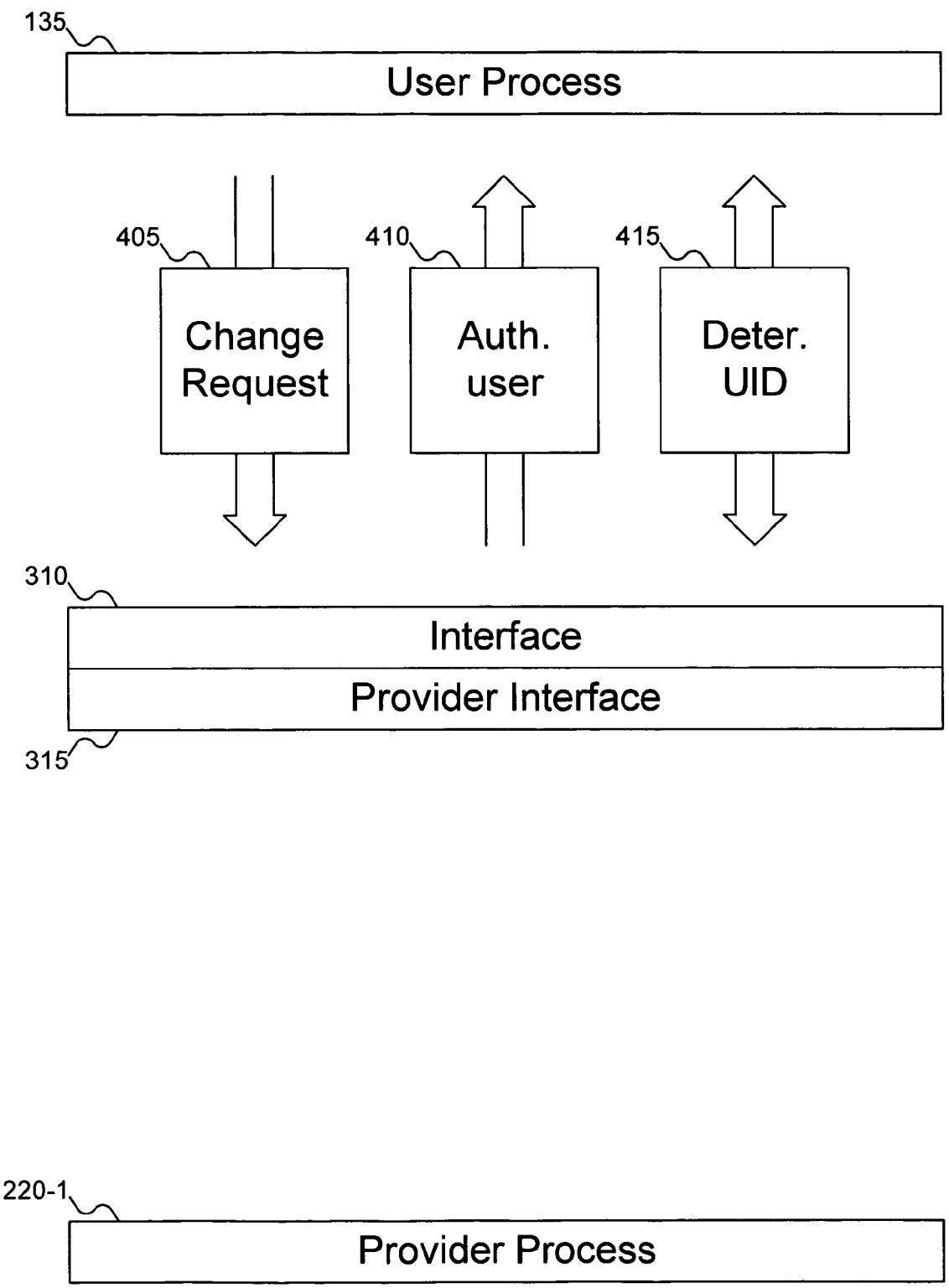
FIGS. 4A-4C show the communication sequence between the user process of FIG. 1 and the provider interface and provider process of FIG. 3, according to an embodiment of the invention.
Figure 4B:
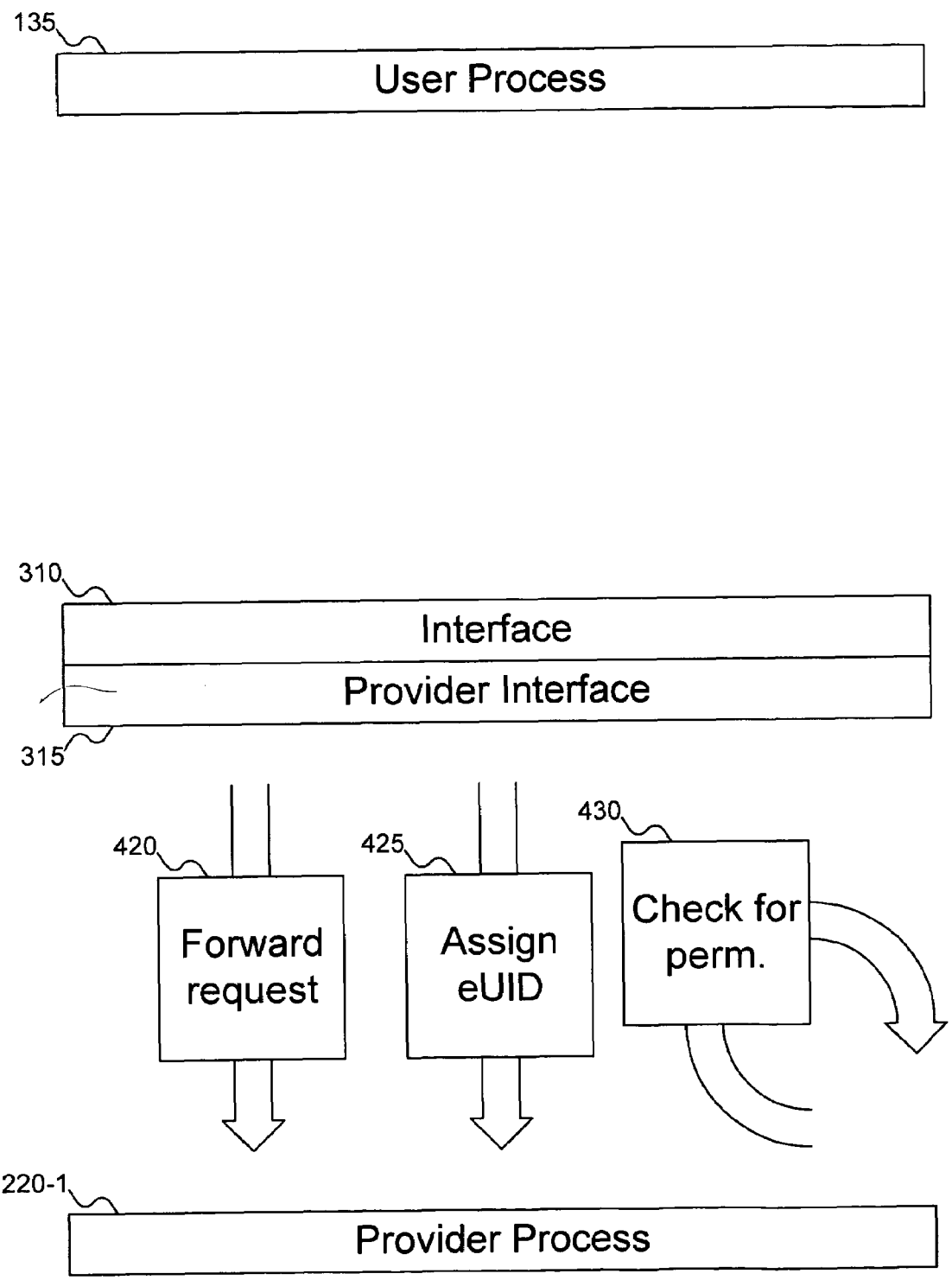
Figure 4C:
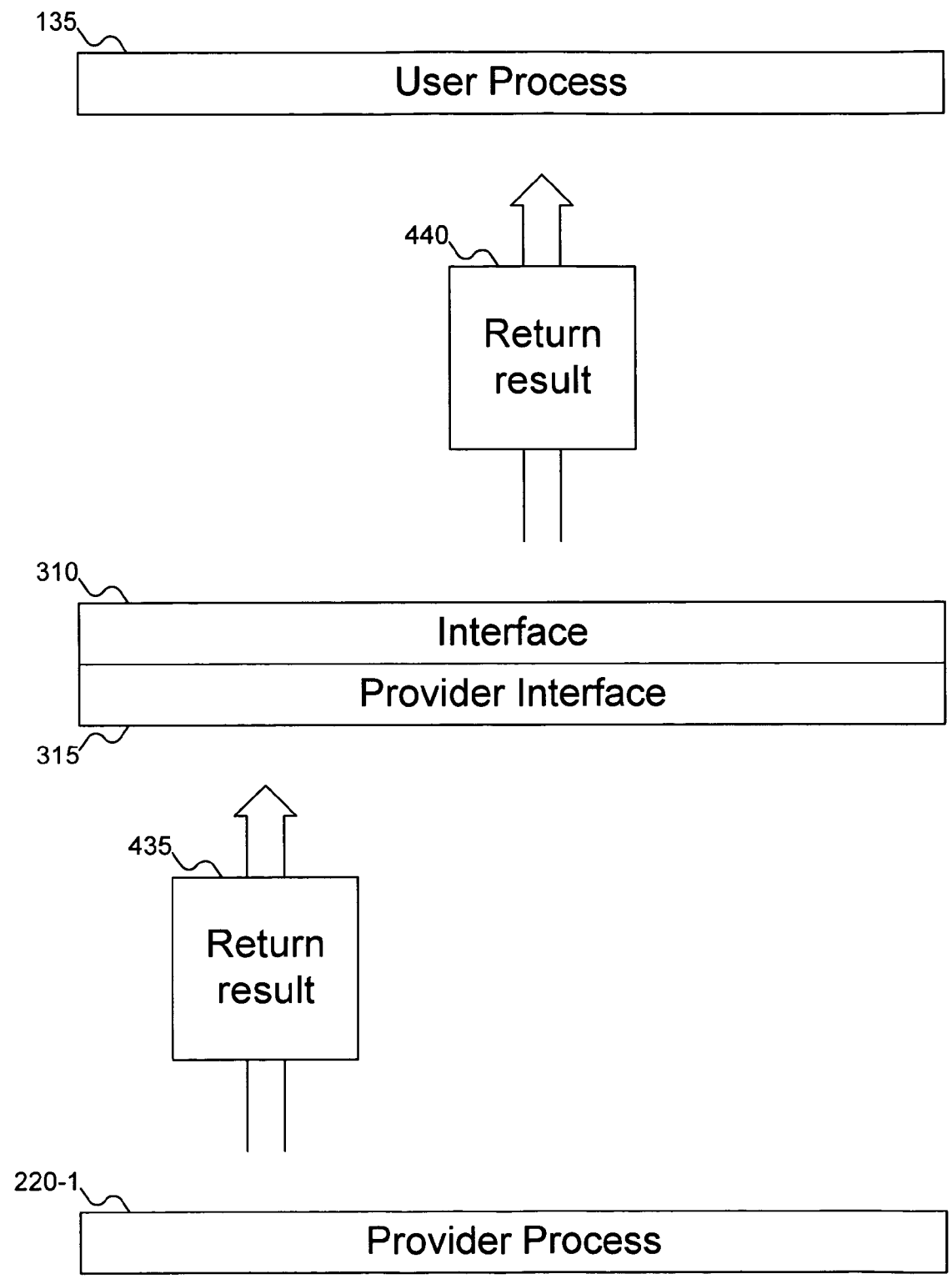

At this point, an example of the operation of embodiments of the invention might be helpful. FIGS. 4A-4C show the communication sequence between the user process of FIG. 1 and the provider interface and provider process of FIG. 3, according to an embodiment of the invention. In FIG. 4A, user process 135 is shown issuing change request 405. Change request 405 can be any change that would require a provider process to carry out. For example, change request 405 might be a request to change a SAMBA configuration file. A person skilled in the art will recognize other changes that can be made as part of change request 405. Provider interface 315 then responds by requesting the user to be authenticated, as shown in authentication 410. After authentication, as shown in UID determination 415, the user's UID is determined.

Once the user has been authenticated and the user's UID determined, provider interface 315 forwards the request to provider process 220-1, as shown in forward request 420 in FIG. 4B. Provider interface 315 assigns the eUID (assign eUID 425) to provider process 220-1, to limit provider process 220-1 to changes the user is entitled to make. Provider process 220-1 then performs permission check 430 to verify that provider process 220-1 can actually make the changes. If provider process 220-1 does not have permission to make the changes, then provider process 220-1 should avoid trying to make the changes. It is preferable that provider process 220-1 not fail for lack of permission, as this would necessitate restarting provider process 220-1 somehow (and could cause other complications, as well).

Once provider process 220-1 has attempted to make the changes, provider process 220-1 returns result 435, as shown in FIG. 4C. Provider interface 315 forwards the result back to user process 135, shown as return result 440.

Figure 5A:
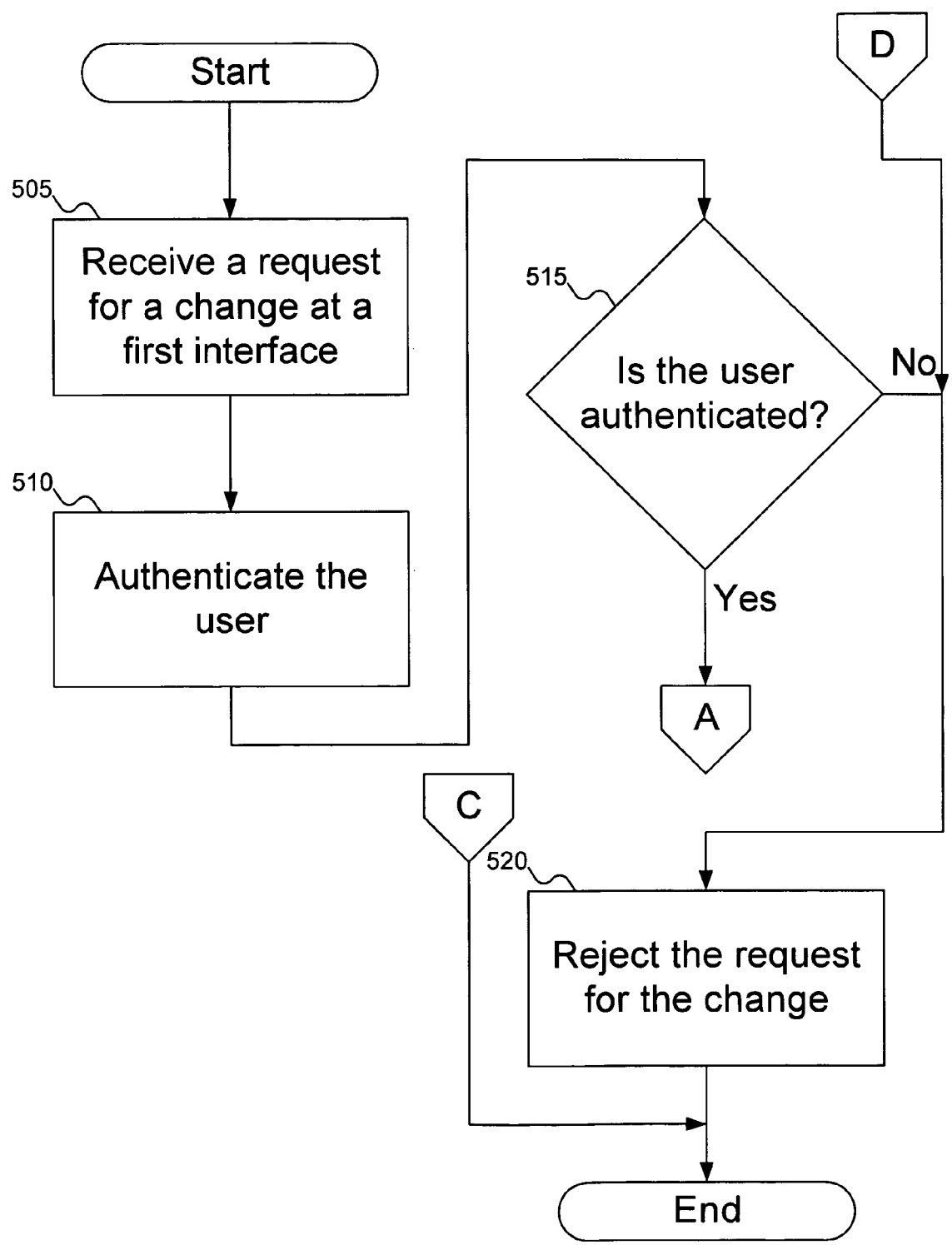
FIGS. 5A-5C show a flowchart of the procedure for communicating with the provider process of FIG. 3, according to an embodiment of the invention.
Figure 5B:
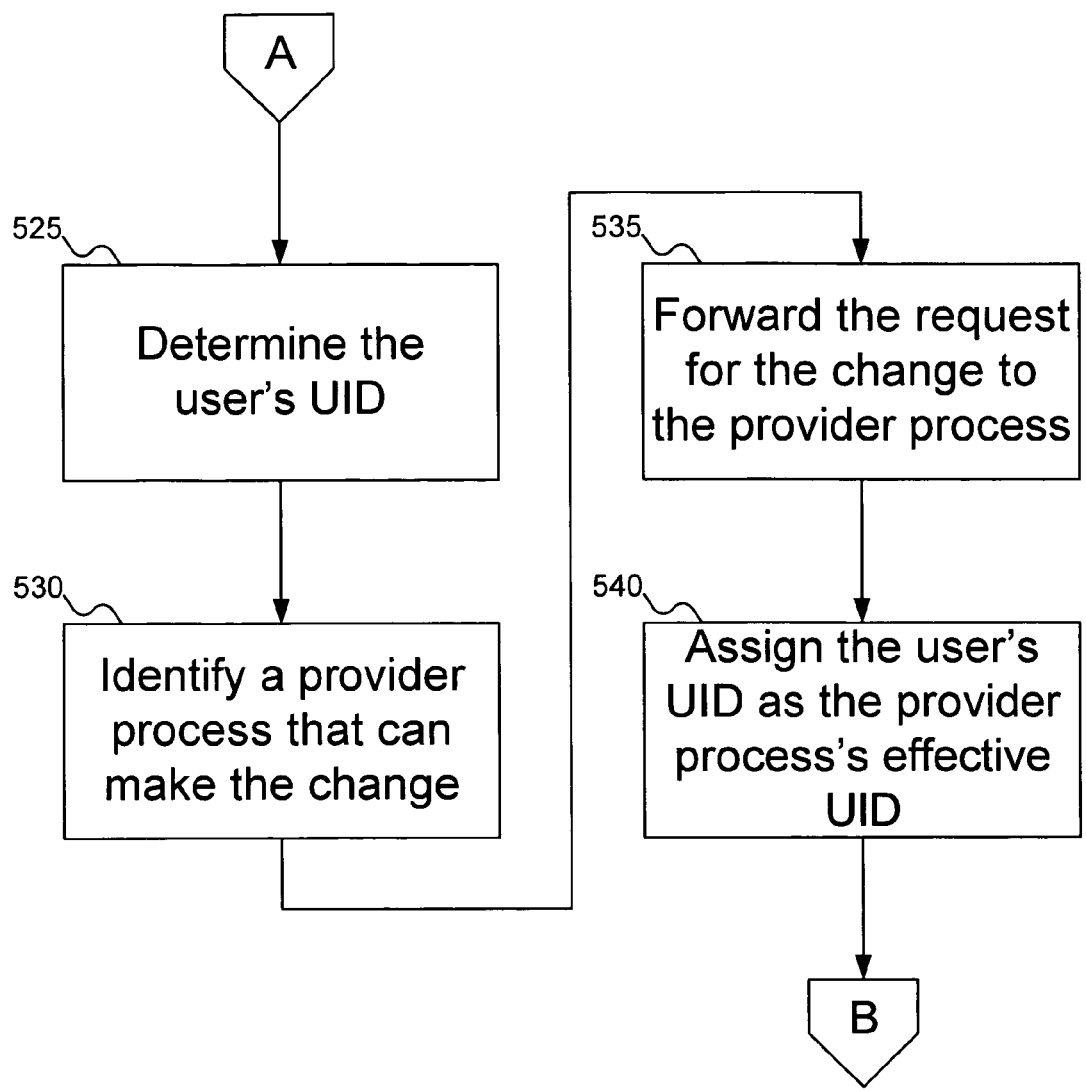
Figure 5C:
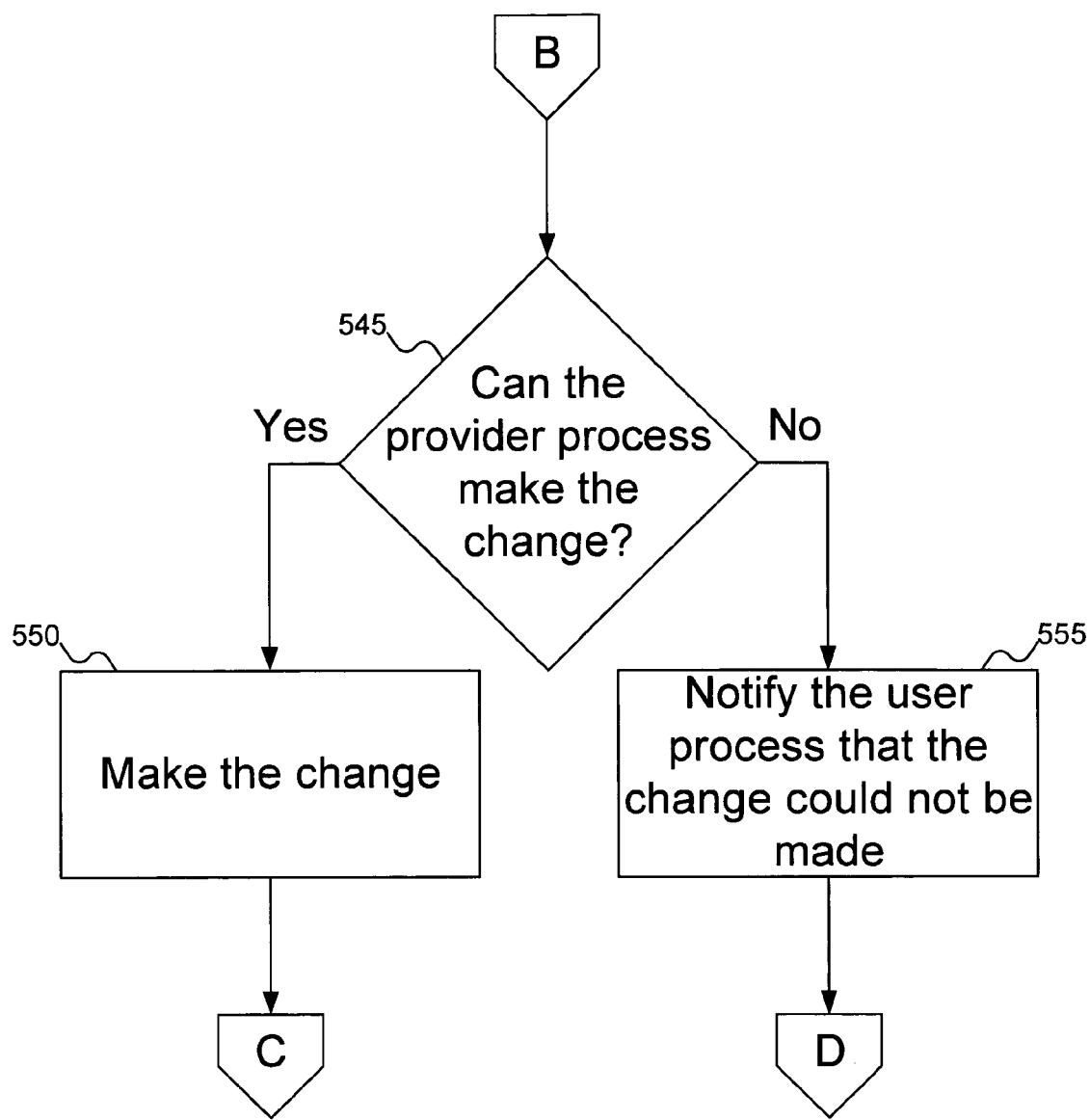

FIGS. 5A-5C show a flowchart of the procedure for communicating with the provider process of FIG. 3, according to an embodiment of the invention. In FIG. 5A, at step 505, the interface receives a request for a change. At step 510, the interface authenticates the user. At step 515, the interface determines whether the user was authenticated. If not, then at step 520, the interface rejects the request without further ado. Otherwise, if the user was authenticated, then at step 525 (FIG. 5B) the interface determines the user's UID. At step 530, the interface determines a provider process that can make the requested change. At step 535, the interface forwards the request to the identified provider process, and at step 540, the interface assigns the user's UID to the identified provider process as its eUID.

At step 545 (FIG. 5C), the provider process determines if it can make the change. As discussed above, this involves checking whether the user has permission to effect the requested change. If the provider can make the change, then at step 550 the provider process makes the change. Otherwise, at step 555, the provider process notifies the user process (via the interface) that the requested change could not be made.

It is worth noting that embodiments of the invention are not required to be implemented in a computer system. Since provider processes run with root privileges, provider processes can make changes on behalf of user processes that the user is technically not authorized to request. By implementing an embodiment of the invention, a provider process can avoid inadvertently making a change for a user that the user was not authorized to make. But provider processes are not required to implement an embodiment of the invention to operate, even with a system designed to support an embodiment of the invention. For example, a provider process can report that it has changed its eUID as requested by the provider interface, even though the provider process does not actually make the change.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit any aspect of the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus implemented in a computer system, comprising:
    a first interface to receive a request from a user process to make a change to a stored file in a system, the user process associated with a user having a user UID;
    a provider process to make the change to the stored file in the system, the provider process having a provider process UID and an effective UID;
    an authentication module to authenticate the user responsible for the user process;
    a UID determiner to determine the user UID of the user responsive to the authentication; and
    a second interface to set the effective UID of the provider process to the user UID and forward the request from the user process to the provider process.

2. An apparatus according to claim 1, wherein the second interface is operative to forward the user UID to the provider process.

3. An apparatus according to claim 2, wherein the second interface is operative to reset the effective UID of the provider process to the user UID of the user.

4. An apparatus according to claim 3, wherein the second interface is operative to change the effective UID of the provider process to a root UID to enable the provider process to communicate with the first interface.

5. An apparatus according to claim 1, wherein the provider process is designed to determine if the user process included a permission necessary to make the change to the system.

6. An apparatus according to claim 5, wherein the provider process is further designed to reject the change if the user process lacked the permission.

7. An apparatus according to claim 6, wherein the provider process is further designed to reject the change without causing the provider process to fail for lack of permission.

8. An apparatus according to claim 1, further comprising a client, including the user process requesting the change to the system.

9. An apparatus according to claim 1, wherein the effective UID causes the provider process to run with reduced privileges.

10. A computer-implemented method, comprising:
    receiving a request from a user process to make a change to a system, the user process associated with a user having a user UID;
    authenticating a user responsible for the user process;
    determining the user UID of the user;
    forwarding the request to a provider process to make the change to the system, the provider process having a provider process UID and an effective UID;
    setting the effective UID of the provider process to the user UID; and
    determining whether to perform the request based on the effective UID at the provider process.

11. A method according to claim 10, wherein setting the effective UID includes forwarding the user UID to the provider process.

12. A method according to claim 10, wherein:
    receiving a request includes receiving the request through a connection to a first interface; and
    forwarding the request includes forwarding the request to the provider process through a provider interface.

13. A method according to claim 12, further comprising resetting the effective UID of the provider process to a root UID to communicate with the first interface.

14. A method according to claim 10, further comprising rejecting the change at the provider process if the user process lacks a permission necessary to make the change.

15. A method according to claim 14, wherein rejecting the change includes rejecting the change without causing the provider process to fail for lack of permission.

16. A method according to claim 14, further comprising notifying the user process that the provider process could not make the change.

17. An article, comprising:
    a storage medium, said storage medium having stored thereon instructions, that, when executed by a machine, result in:

receiving a request from a user process to make a change to a system, the user process associated with a user having a user UID;

authenticating a user responsible for the user process;

determining the user UID of the user;

forwarding the request to a provider process to make the change to the system, the provider process having a provider process UID and an effective UID;

setting the effective UID of the provider process to the user UID; and determining whether to perform the request based on the effective UID at the provider process.

18. An article according to claim 17, wherein setting the effective UID includes forwarding the user UID to the provider process.

19. An article according to claim 17, wherein:

receiving a request includes receiving the request through a connection to an first interface; and forwarding the request includes forwarding the request to the provider process through a provider interface.

20. An article according to claim 19, wherein the storage medium has further instructions stored thereon that, when executed by the machine result in resetting the effective UID of the provider process to a root UID to communicate with the first interface.

21. An article according to claim 17, wherein the storage medium has further instructions stored thereon that, when executed by the machine result in rejecting the change at the provider process if the user process lacks a permission necessary to make the change.

22. An article according to claim 21, wherein rejecting the change includes rejecting the change without causing the provider process to fail for lack of permission.

23. An article according to claim 21, wherein the storage medium has further instructions stored thereon that, when executed by the machine result in notifying the user process that the provider process could not make the change.

\* \* \* \* \*